May 23, 1933.  R. C. BENDER  1,910,232
HUMIDIFIER AND DUST COLLECTOR
Filed April 15, 1929   4 Sheets-Sheet 1
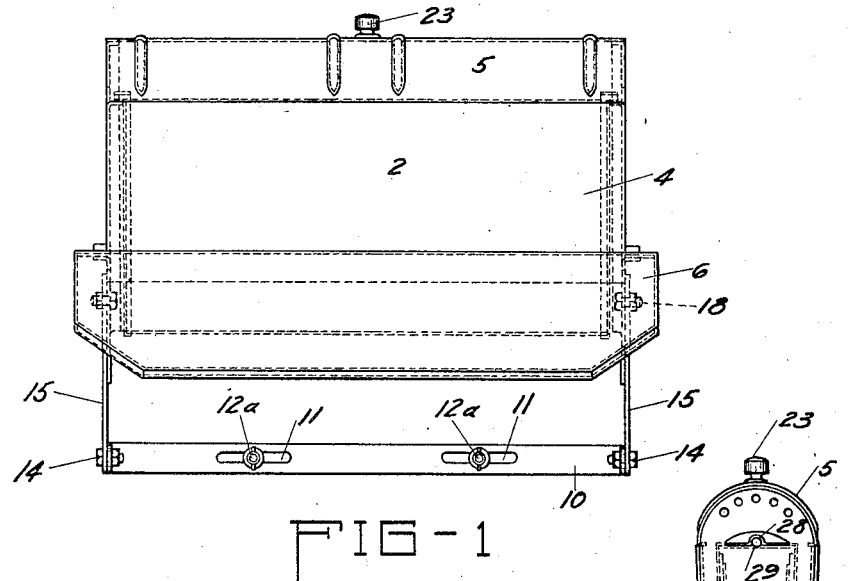
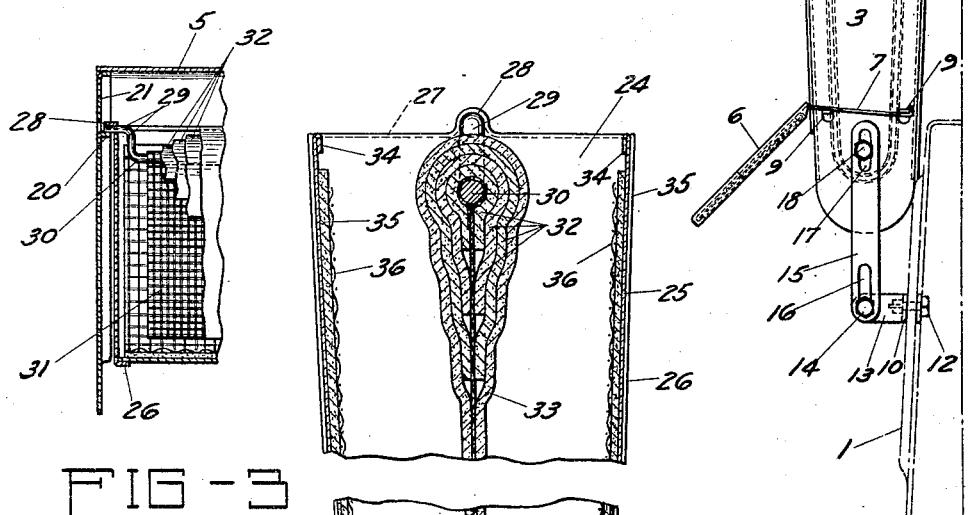
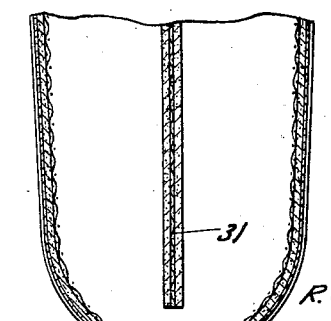
R. C. BENDER INVENTOR.
BY Merrill M. Blackburn
ATTORNEY May 23, 1933.　　　　R. C. BENDER　　　　1,910,232
HUMIDIFIER AND DUST COLLECTOR
Filed April 15, 1929　　　4 Sheets-Sheet 2

R. C. BENDER INVENTOR.

BY
Merrill M. Blackburn
ATTORNEY

May 23, 1933.  R. C. BENDER  1,910,232
HUMIDIFIER AND DUST COLLECTOR
Filed April 15, 1929   4 Sheets-Sheet 3
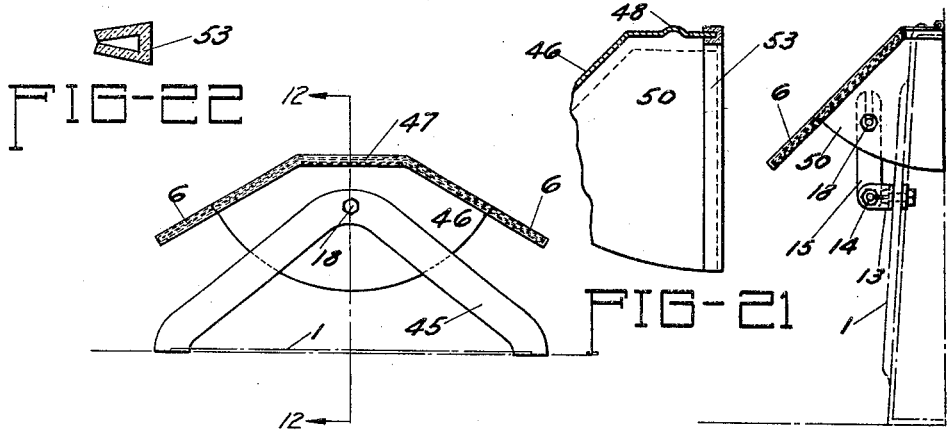
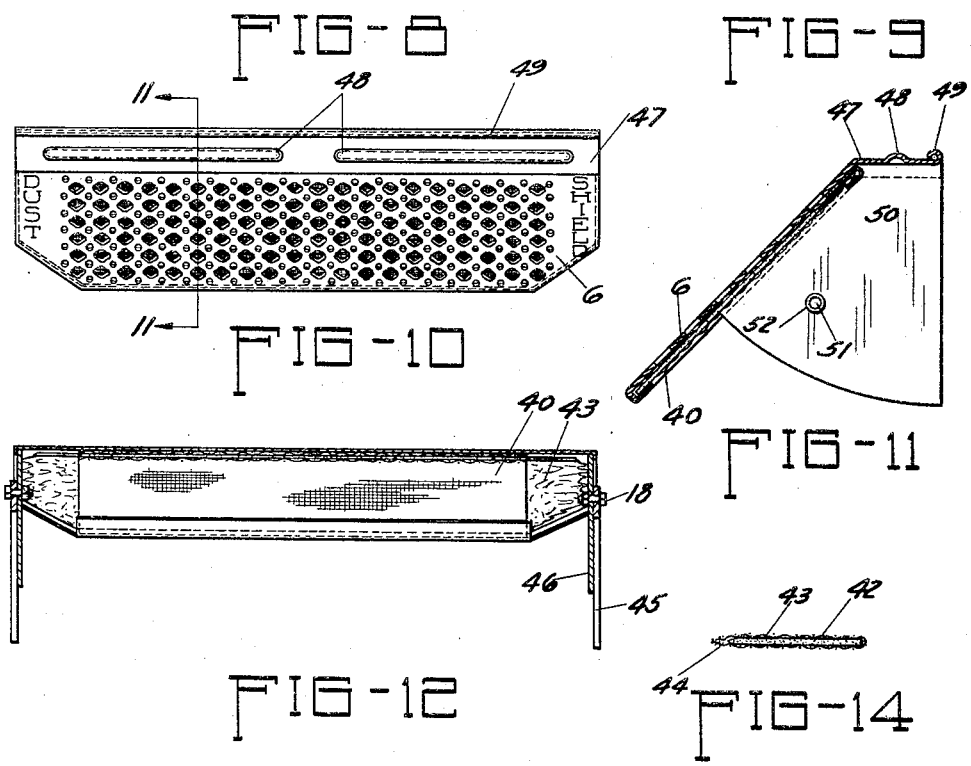
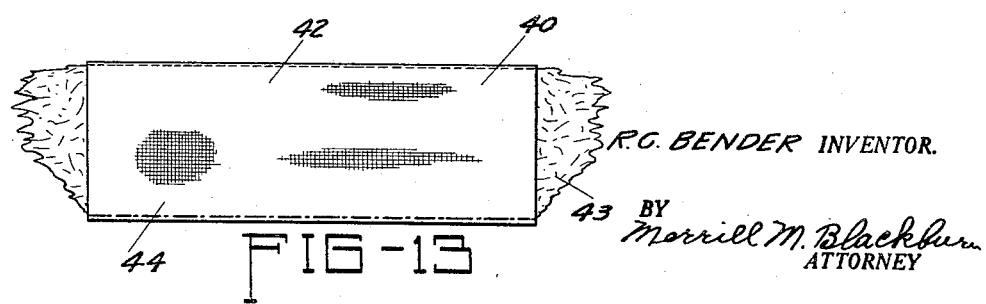
R. C. BENDER INVENTOR.
BY Morrill M. Blackburn
ATTORNEY

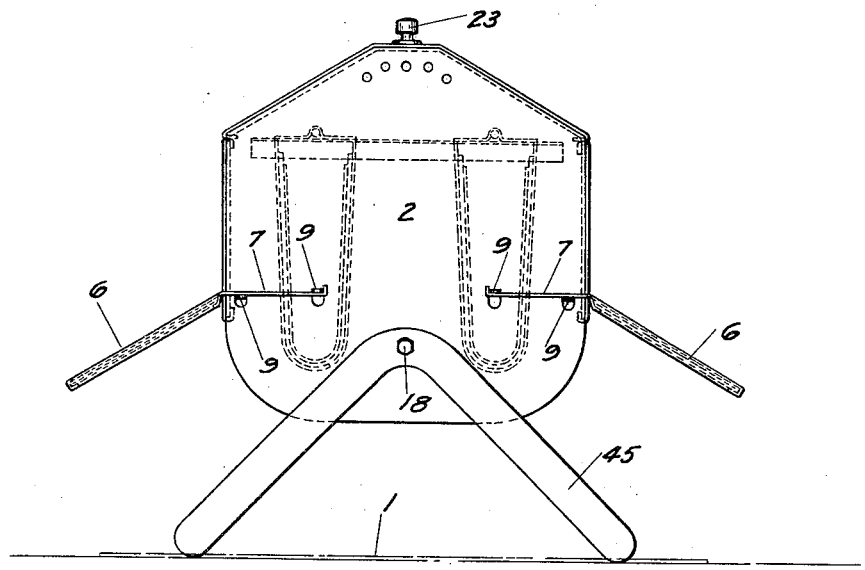
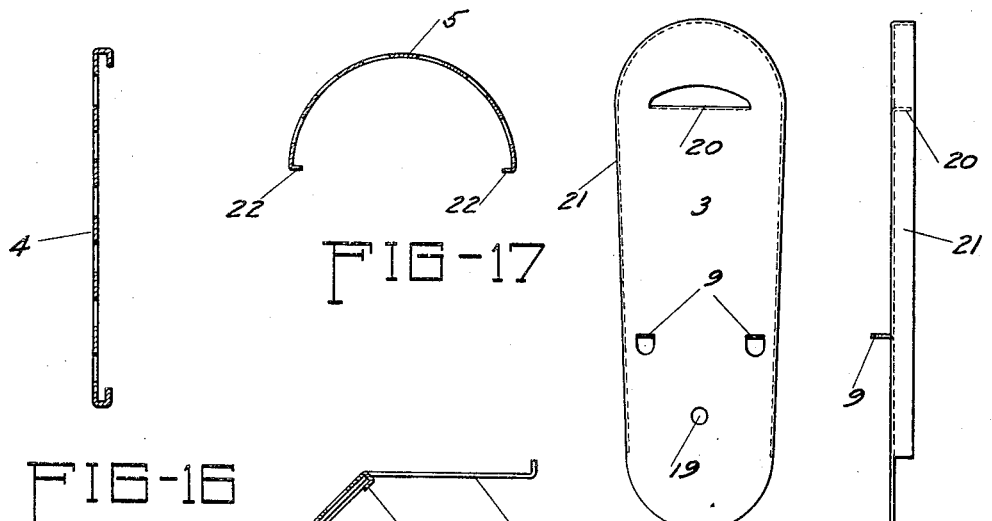
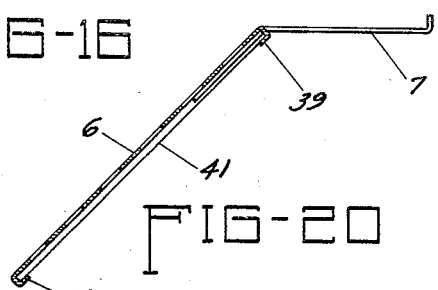

Patented May 23, 1933

1,910,232

UNITED STATES PATENT OFFICE

ROBERT C. BENDER, OF DAVENPORT, IOWA

HUMIDIFIER AND DUST COLLECTOR

Application filed April 15, 1929. Serial No. 355,330.

The present invention pertaines to improvements in the structures shown, described and claimed in my prior co-pending applications and prior patents, more specific reference to which is not considered necessary in the present application. This device, as is readily apparent pertains to means for filtering or filtering and humidifying warm air delivered from a heating plant through a wall or floor register. Among the objects of the present invention are to improve upon certain parts of the construction disclosed in my prior applications and patents; to simplify manufacturing operations; to cheapen the cost of production of a device of the character indicated, without lowering the quality thereof; to provide a device of the character indicated which is adapted to be applied to a floor register; to improve upon the dust filtering medium for use in a device of the character indicated; to provide a greater degree of interchangeability of parts in a structure of the character indicated; to improve upon the means for increasing the evaporation of water; to provide a device of the character indicated having a greater capacity for water evaporation; and such further objects, advantages and capabilities as will hereafter appear and as are inherent in the construction disclosed herein. My invention further resides in the combination, construction and arrangement of parts illustrated in the accompanying drawings and, while I have disclosed therein what is now considered the preferred embodiment of my invention, I desire the same to be understood as illustrative and not to be construed in a limiting sense.

Figure 5:
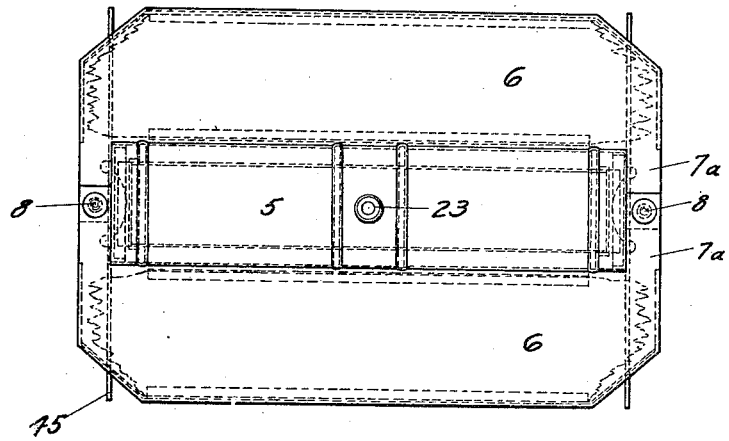
Figures 6, 7:
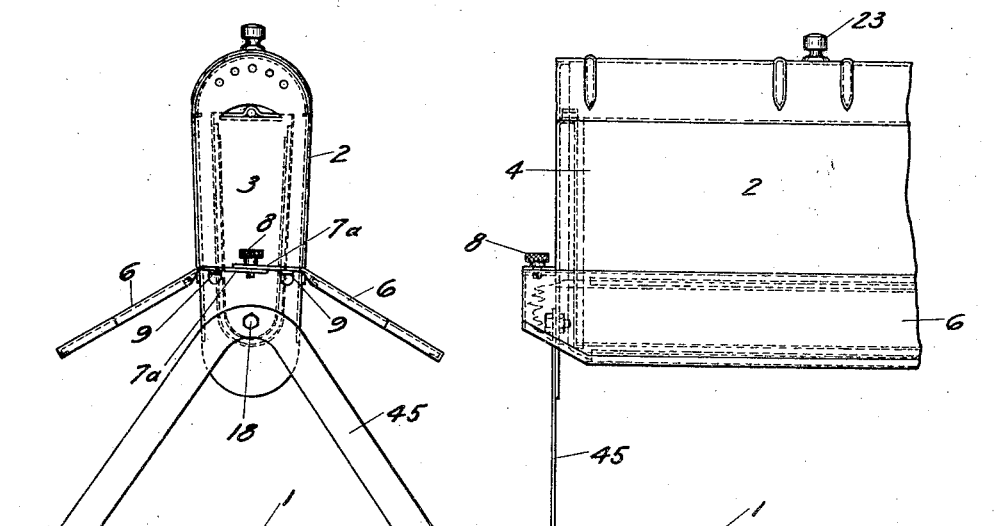

In the drawings annexed hereto and forming a part hereof, Fig. 1 is a front elevation of a structure embodying part of my improvement; Fig. 2 is an end view of the structure shown in Fig. 1, the same being shown attached to a wall register; Fig. 3 is a fragmentary longitudinal central section through the structure shown in Figs. 1, 2 and 4; Fig. 4 is a transverse section through the water containing pan shown in Figs. 1, 2 and 3 and illustrating in detail a means for increasing water evaporation; Figs. 5, 6 and 7 are respectively plan, end elevation and fragmentary side elevation of the structure shown on sheet 1 set up for use for a floor register; Fig. 8 is an end view of a dust filter for use above a floor register, the same not being provided with any humidifying means; Fig. 9 is an end view of a dust filter applied to a wall register, the same not being provided with a humidifier; Fig. 10 is a plan view of the structure shown in Fig. 9; Fig. 11 is a transverse section substantially along the plane indicated by the line 11—11, Fig. 10; Fig. 12 is a longitudinal vertical section substantially along the plane indicated by the line 12—12, Fig. 8; Fig. 13 is a detached view of a dust mat used in connection with any of the foregoing constructions; Fig. 14 is a transverse section of this dust mat; Fig. 15 is a view similar to Figs. 6 and 8 but showing a large sized humidifier for increasing the amount of water evaporation; Fig. 16 is a transverse section through one of the air shields omitting the dust mat and attaching arm; this also represents a transverse section through a front vertical wall of a humidifier casing; Fig. 17 is a transverse section through a cap in a construction such as shown in Figs. 1, 2, 5, 6 and 7; Fig. 18 is a face view of an end plate of such a humidifier casing; Fig. 19 is an edge view of the structure shown in Fig. 18; Fig. 20 is a transverse section through a dust shield with the dust mat omitted; Fig. 21 is a fragmentary view illustrating the application of a felt, rubber or other gasket to the edge of the metal; Fig. 22 is a cross section, enlarged, of a rubber gasket intended for this purpose.

In the constructions shown in my prior patents numbered 1,668,000, 1,668,041 and 1,668,042, it will be noted that the humidifier casing and can are, in each instance, so made that the ends are rights and lefts and therefore require a separate die for each. These constructions also are made in other ways so that there is a lack of interchangeability of parts making it necessary to provide several dies for the manufacture thereof. I have found that by changing the shapes of some of these parts it is possible to reduce very materially the number of dies required for the manufacture thereof. I have also improved upon the construction of the dust mat for use in a structure of this character and this forms one of the important parts of the present invention.

Referring more in detail to the annexed drawings, numeral 1 denotes a register through which heat is to be delivered to a room and 2 a humidifier casing to be mounted adjacent the register, either against the upper portion of the front face of the register as in Fig. 2 or above the register as in Figs. 5, 6, 7 and 15. The humidifier casing has identical end walls 3 and a perforated wall 4. If the humidifier is to be used against the wall register as shown in Fig. 2, the back wall thereof will be imperforate to prevent the passage of heat out of the back side of the humidifier and force the same out of the top and the front. As shown in Fig. 17, the top 5 is perforated the same as the dust shield shown in Fig. 10. The same die that is used for perforating the metal as shown in Fig. 10 is used to perforate the front side 4 of the humidifier casing. If the humidifier is to be used over a floor register as shown in Figs. 5, 6 and 7, the two opposite substantially vertical faces are perforated in the manner shown in Fig. 10. Except for the supporting brackets at 7, the dust shield 6 is identical in all of the forms shown. The brackets 7 are strips of metal which are secured, preferably by spot welding, to the dust shield and are usually formed as shown in Figs. 2 and 15. When the dust shield is to be used with a form such as shown in Fig. 6, the brackets 7 are replaced by the similar brackets 7a which are perforated for the reception of a screw 8 by means of which they are secured together. Lugs 9 are formed in the ends 3 by punching portions thereof outwardly to form projections to sustain the dust shields.

To support the humidifier in place in front of a register, a bar 10 is provided with slots 11 in which are located bolts 12 provided on their outer ends with suitable securing means 12a, such as wing nuts. The bar 10 has its two ends bent outwardly into projecting arms 13 which are perforated for the reception of securing means 14 such as bolts. As shown in Fig. 1, these bolts are provided on their inner ends with nuts by means of which the links 15 can be clamped to the arm 13 as shown in Figs. 1 and 2. The links 15 may be slotted as shown at 16 and 17 in order to make it possible to secure the desired vertical adjustment of the humidifier which is held in place with relation to the links 15 by means of suitable securing means 18. The ends 3 are provided with suitable perforations 19 for the passage of the securing means 18 and are also provided with an inwardly extending bracket 20 formed by perforating the end as shown in Fig. 18 and bending inwardly the part of the metal which is partially severed from the end. The lug 20 is formed in the same manner as the lugs 9 but extends in the opposite direction. These inwardly extending lugs serve as supporting means for the humidifier unit which is placed inside of the casing 2, as shown clearly in Fig. 3. The ends 3 are formed around their tops and sides with a flange 21 which serves as means to which may be secured the front and back faces of the casing. As shown in Fig. 3, the flange 21 also serves as a rest for the top side of the casing. Flanges 22 are formed along the longitudinal edges of the top or cover 5 and rest upon the upper edges of the front and back faces of the casing. A more or less ornamental knob 23 may be secured to cover 5 if thought desirable.

The humidifier unit is shown more or less in detail in Figs. 3 and 4 and comprises an open top receptacle having end walls 24 and a body element 25. The end walls are identical in construction and have a flange 26 around their periphery, except at the top, where the flange 27 extends in the opposite direction. This flange is partly severed from the end and expanded outwardly as indicated at 28 for the reception of the upwardly bent portion 29 of the suspending means 30. A piece of wire netting 31 which is not readily oxidizable under such conditions of use as is found in this device has one edge wrapped around the supporting member 30 and extends away from that member. Strips of suitably absorbent material of different widths are wrapped around the rod 30 as indicated at 32 in Fig. 4 and are held in place by another piece of absorbent material 33 which is wide enough to reach to the remote edge of netting 31 upon both faces thereof. This device having been made up, one end 29 of the supporting member 30 is inserted under one of the parts 28, at one end of the container, and then the rod 30 is bent until the other end can be inserted under the part 28 of the opposite end of the container. Now, when this rod is released, it springs back into shape and is held in place by reason of the ends 29 engaging under the retaining means 28.

The upper edges of the wall 25 are turned inwardly and downwardly as indicated at 34 to form reinforcing ribs at the upper edges of the container and to reduce the likelihood of a user becoming injured thereby. Lining the inside of the container and resting tightly against the wall thereof, is a fabric 35 which is absorbent for water. A piece of metal netting 36 of suitable size and shape keeps the fabric 35 pressed against the walls 25 of the container and permits access of the water thereto. It will be seen from the foregoing that the fabric will absorb the water, so long as there is any in the container, and this water will be carried by capillary attraction throughout the body of the fabric. This will always keep a maximum of water in such a position that it can be evaporated into the air which is delivered by the register into the humidifier casing. The foregoing description of the humidifier unit applies to the structures shown on sheets 1, 2 and 4 of the present drawings.

The general features of the dust guard and more or less of the details thereof will next be described. As indicated above, while there are certain features of the dust guard which are common in all of the forms thereof illustrated in the present drawings, there are certain slight variations between the different forms illustrated. The forms illustrated in Figs. 1, 2, 15 and 20 are identical in construction and all have on the inner surface thereof the dust pad illustrated in Figs. 12, 13 and 14. The general shape of this dust shield is shown in Fig. 1 and the shape of the attaching arms 7 is illustrated clearly in Fig. 20. The fact that the flat sheet metal part of this shield is perforated for the passage of air therethrough is illustrated clearly in Figs. 10 and 20, the perforations therethrough being of two different types, as illustrated in Fig. 10. As previously stated, the die for forming these perforations is so constructed as to form all of them from the one die, irrespective of any variations in the particular details of construction of the shield. Fig. 20 shows that the dust shield 6 has a flange 39 turned downwardly and inwardly of each of its two longer edges to serve as holding means for the dust mats 40. At its two ends flanges 41 are turned downwardly to furnish a finish for these edges. The dust mats 40 are made of wire netting and steel wool, the former being indicated at 42 in Figs. 13 and 14 and the latter at 43. The netting when folded over as shown in Fig. 14, has its edges secured together as indicated at 44 and this therefore holds the steel wool in place within the netting.

In the forms of this invention which are to be supported above a floor register, as shown on sheets 2, 3 and 4, supporting legs 45 are connected to the humidifier casing by the holding means 18. In the form shown in Fig. 8, an end plate 46, cut in proper shape, may be suitably secured to the dust shield and may then have the legs 45 secured thereto by the bolts 18 as is obvious from Fig. 8. The dust shield portion of this construction comprises two inclined portions 6 connected by a flat top portion 47. This latter may be imperforate, if desired, but it is believed that it, as well as the inclined portions 6, should be perforated to permit the heated air to pass vertically therethrough. If this is done, all three of these parts will be provided on their under surfaces with dust mats 40 similar to that shown in Fig. 13. As illustrated in Figs. 10 and 11, ornamental and reenforcing ribs 48 and a reenforcing bead 49 may be provided in the portion 47 of the dust shield. If desired, guards 50, secured to the dust shields 6, may be perforated for the reception of a holding means 18, the links 15 being rigidly secured to the arms 13 and thus furnishing means for holding the dust shields properly positioned. In Fig. 9 the link 15 is illustrated as being slotted clear through the end so that it will be possible to lift the dust shield up after loosening the bolts 18, thus withdrawing the dust shield for cleaning purposes. When this has been done, the dust pad on the under side of the shield may be removed the same as in the other form illustrated, and the dust cleaned out of same before it is returned to its place. It is clear that with this construction the guards 50 and links 15 will hold the dust shields properly positioned with relation to the register. In the construction shown in Fig. 11, the guard plate 50 is shown as perforated at 51 and this perforation has a flange 52 extending around the same and inwardly so that the flange may slip into the slot in the end of the link 15 and thereby hold the dust shield in position without the use of any additional means 18.

Fig. 15 illustrates a form provided when it is desired to have an additional amount of water evaporated into the atmosphere. In this form of construction, two or more humidifier units may be mounted in a large sized humidifier casing and this will provide additional heated space and fabric for the vaporization of the water.

The gasket of Figs. 21 and 22 may be constructed of any desirable material, such as rubber or felt. If constructed of rubber, the walls thereof will be given an inclination, as shown in Fig. 22, when being formed, such that they will have to be spread in order to insert the metal between them. This will make the rubber normally tend to grip the metal, thereby holding the two in assembled relation. This gasket 53 is shown in Fig. 21 as applied to the edge of the metal, the same being ready to be applied against a wall so as to form a tight seal between the metal and the wall to prevent the escape of smudge or dirt laden air between the filter and the wall. It is thought that in some instances a felt gasket would be preferable for such use and the same could be secured to the metal with a suitable glue or the like and be held thereby in place upon the metal. It will be noted that the roll 49 is omitted from the edge of the dust shield, as illustrated in Fig. 21. If this were not done, it would be necessary to have gaskets of two different sizes, one to fit over the roll 49 and the other to fit along the edges of the wing plates 50.

It will be evident from the foregoing descriptions when taken in connection with the annexed drawings, that I have provided an apparatus capable of fulfilling the various objects set forth herein.

Having now described my invention, I claim:

1. In an air humidifier, a fluid container and means mounted therein to assist in the vaporization of fluid contained in the container, said means comprising a supporting element, a metallic supporting element depending from the first named supporting element and layers of fabric surrounding said first named supporting element and extending along opposite sides of the second named supporting element, one of said layers of fabric extending into proximity to the bottom of the container.

2. In an air humidifier, a fluid container provided adjacent the upper edges of two opposite sides with perforations for the reception of a supporting member, a rod-like supporting member bent into angular shape and having its ends inserted in the said perforations, layers of fabric of increasing width surrounding said rod-like member and extending downwardly into the container, each layer extending farther down than the one next farther in, and the last one extending into proximity to the bottom of the container.

3. In a humidifier, a fluid-tight container having an absorbent fabric lining the bottom and side walls thereof and wire fabric holding the absorbent fabric against the inside of the container walls, said container having substantially identical end walls provided at their upper edges with perforations for the reception of a rod-like member, a bent rod-like member having its ends offset laterally with relation to the body thereof and inserted into the openings in the edges of the container ends, a metallic fabric supported on the body of the rod-like member, and fabric layers surrounding said rod-like member and extending along opposite sides of the wire fabric to assist in causing vaporization of the fluid in the container.

4. In a dust filter of the character described, a perforate container to be mounted above and in proximity to a register, means for supporting said container in such position, said container being provided upon opposite sides with dust shields for removing dust from air passing outwardly through the register.

5. In a structure of the character described and for the purpose indicated, an open bottomed container having substantially identical interchangeable end walls, said end walls having perforations formed therein and the material which is removed from the sheet during the making of the perforations being bent outwardly from the material to form a supporting ledge projecting from a face of the end, in combination with a liquid holding tank supported on said ledge.

In witness whereof, I hereunto subscribe my name to this specification.

ROBERT C. BENDER.